United States Patent Office 2,984,325
Patented May 16, 1961

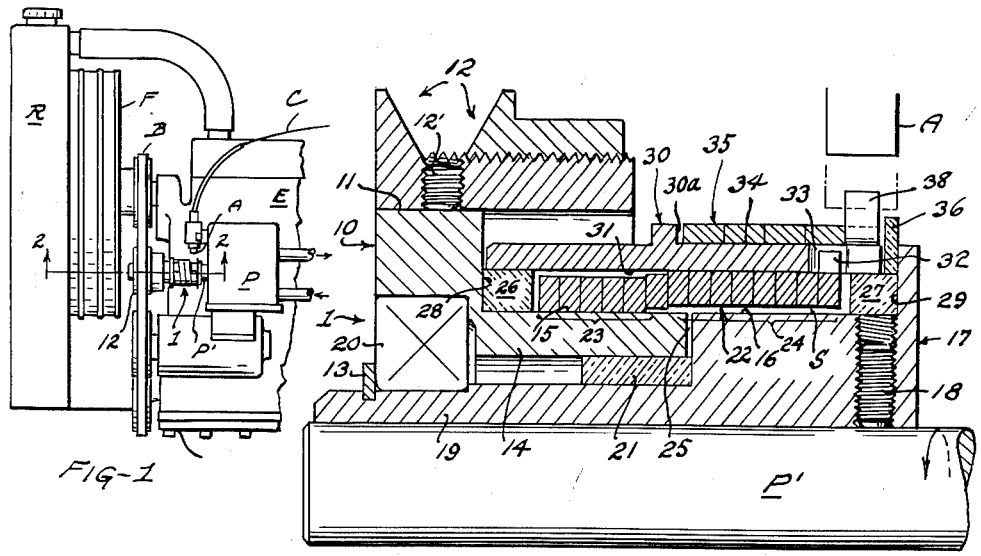
FIG-1
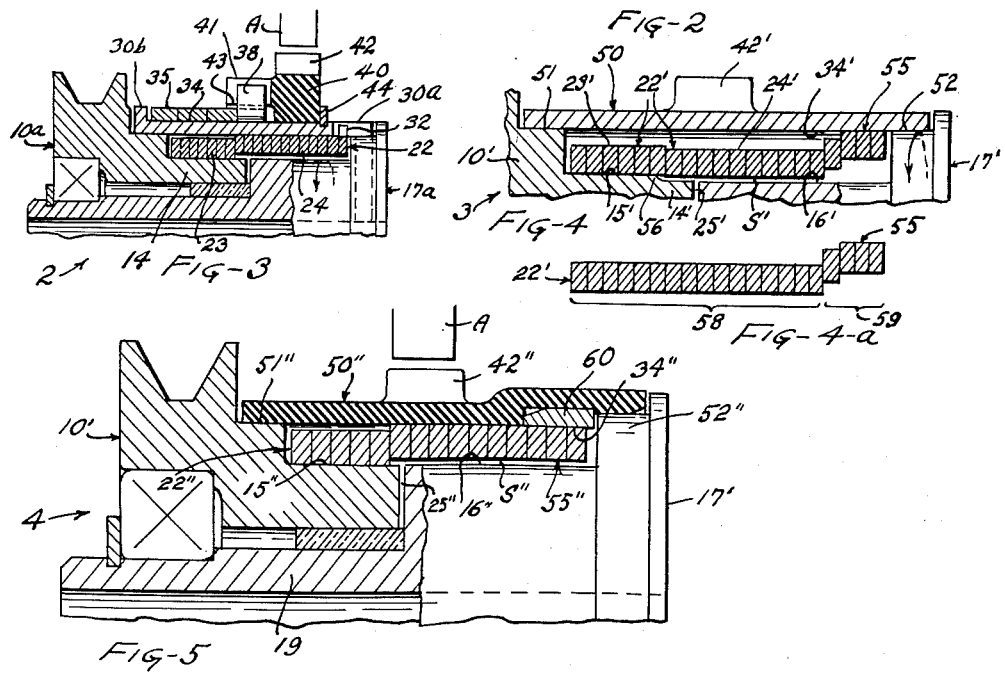
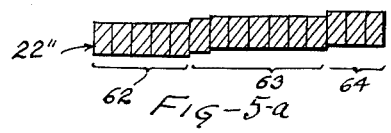
INVENTORS
DONALD R. TOMKO
RUSSELL F. NEFF
BY George M. Soule
ATTORNEY

2,984,325

INTERMITTENT STOP CONTROL SPRING CLUTCHES

Donald R. Tomko, Cleveland, and Russell F. Neff, East Cleveland, Ohio, assignors to Curtiss-Wright Corporation, a corporation of Delaware Filed Nov. 28, 1958, Ser. No. 777,140

12 Claims. (Cl. 192—81)

The present invention, as illustrated herewith, is embodied in a normally disengaged type of helical friction spring clutch unit, or one adapted to be idle for the larger portion of the total operating time as of a motor or engine to be connected to a load through operation of the clutch. It is common in the art to arrange the components of normally disengaged type helical spring clutches so that the clutch spring connected to a continuously rotating input drum is or can have free end coils normally out of contact with the output drum during disengagement. Actuation of such clutch springs into gripping engagement with cooperating clutch drums has been accomplished in numerous ways heretofore, but in all instances with which we are familiar the energizing force applied to the spring to cause it to grip its drum is subject to large variations, wherefore the peak torque which the clutch will transmit cannot be reliably predicted. The present spring clutch unit operates as a reliable torque limiter through use, inter alia, of an overrunning relationship between a clutch control helical coil member preloaded on and in full floating relationship to a cooperating control drum member, whereby the energizing torque applied to the main driving helical spring of the clutch via a suitably chosen number of coils thereof can be readily computed or predetermined within practicable and desirable limits.

A further important feature of the present invention involves a positively acting simple means for insuring that, during disengagement periods of the clutch, the normally free coils of the main driving helical spring will be entirely out of contact with their associated drum or drums.

As a suitable illustration of one use of the present invention, one form thereof is shown herewith as designed to serve in hydraulic lift equipment on automotive type vehicles, e.g. road graders, farm implements, etc., wherein a fluid pressure generator such as a rotary pump is connected to the engine through the clutch for operation of the pump to perform lifting operations and the like under manual control at required intervals. A satisfactory spring clutch for such power take off installation equipment driven by the vehicle engine should allow some slip for shock absorption during engagement, must be compact in view of limited space available near the engine, must be free from destructive heat producing friction and must be capable of on-off control by simple means preferably disposed radially of the clutch operating axis since usually space axially of the clutch is extremely limited. Low cost and long operating life without requirement of service are also of great importance.

In the accompanying drawing, Fig. 1 is a small scale fragmentary side view showing a typical installation of the present clutch on an automotive type power unit.

Fig. 2 is a relatively greatly enlarged longitudinal sectional fragmentary view showing one half of the present clutch in one form, the section being taken as indicated by the line 2—2 on Fig. 1.

Fig. 3 is a reduced scale view corresponding to Fig. 2 showing a modified actuating means for the clutch control overrunning helical spring member arranged approximately as in Fig. 2.

Fig. 4 is an enlarged scale fragmentary view also corresponding generally to Fig. 2 but showing the control helical spring member as an integral part of the main or driving helical clutch spring. Fig. 4a is a fragmentary longitudinal view of the helical spring of Fig. 4 as formed or in a relaxed state (i.e. before being mounted in the clutch).

Fig. 5 is a more complete but fragmentary view of a construction generally similar to that of Fig. 4 but with further modifications. Fig. 5a is a view corresponding to Fig. 4a but showing the helical spring according to Fig. 5 in a relaxed state.

In the embodiments of the invention shown herewith by way of example the main or driving helical springs (22, 22', 22'') are of the contracting-to-grip type. The terms "normal" or "normally" (e.g. normally disengaged) are employed as convenient reference terms and not as essential limitations. Each herewith illustrated clutch could advantageously be engaged most of the total operating time involved, depending upon circumstances of use (e.g. speed of operation).

In Fig. 1 a rotary hydraulic pump P is mounted near the base portion of the engine E so that its driving shaft P' projects forwardly to support the present subject clutch 1 in position to be driven by the fan belt B connected with the engine crank shaft and the fan (not shown) in casing F. In such an installation there is insufficient room ahead of the pump shaft P' for clutch actuator means operating along the axis of such shaft. A suitable actuator for the clutch 1 may comprise a lever or plunger A arranged for operation toward and away from the rotational axis of the clutch 1 by a cable C or other linkage leading to the driver's compartment or work space.

As shown in Fig. 2 the input member 10 of the clutch 1 has a hub portion 11 carrying an adjustable V-belt-engaging sheave assembly 12 secured as by a series of set screws, one shown at 12'. A clutch drum portion 14 of member 10 has a generally cylindrical clutch drum surface 15. A complementary output drum having a similar clutching surface 16 of approximately the same diameter as that of drum surface 15 is part of a shaft adapter 17 secured to the pump driving shaft P' as by one or more screws 18. Shaft adapter 17 has a tubular portion 19 extending through the input member 10 and supporting it for rotation relative to shaft P' as on suitable bearings 20 and 21. The components mentioned thus far are held in assembled relationship as by a snap ring 13.

The main or driving clutch spring 22 is full floating as shown, and has a series of coils 23 in interference fitting or preloaded relationship to drum surface 15 as one means for operatingly anchoring the spring to the input member 10, and has a series of coils 24 bridging the crossover gap 25 and being, as formed or coiled, of larger diameter than the coils 23 so as normally or during clutch disengagement to be in radially spaced relationship to the drum surfaces 15 and 16. The thus-established normal radial clearance S is greatly exaggerated for emphasis in the drawing. The clearance should be approximately equal to the interference fit or preloading that would be required if the coils 24 were to be self energizing on drum surface 16. The clutch spring 22 is held more or less loosely in position axially by separate bearing metal rings 26 and 27 held firmly against axially oppositely facing shoulders 28 and 29 formed on the input hub portion 11 and on the shaft adapter 17 respectively.

The control drum member 30 for the clutch 1 is shown in the form of a sleeve whose opposite ends are supported by the bearing rings 26 and 27 for free rotational or angular movement of the member 30 with respect to the input member 10 of the clutch. The control drum member 30 has a cylindrical internal surface 31 in radially spaced relation to the anchor coils 23 and which, during disengagement of the clutch, is preferably in light contact with the coils 24 so as to maintain those coils concentric with and spaced slightly from the output drum surface 16 at all points. An operating connection between the rightward or free end of the clutch spring 22 and the control drum member 30 is represented by a radial toe 32 formed on the spring and lying in an axial slot 33 in the control drum member 30.

Normally (or while the clutch 1 is disengaged as shown in Fig. 2), the driving clutch spring 22, through its expanded coils 24 and toe and slot connection 32, 33, holds the control drum 30 in a predetermined angular relationship to the input member 10 of the clutch as the spring 22 and control drum 30 turn bodily with the input member 10 (direction per arrow on shaft P' in case the spring 22 is left hand wound). The clutch control helical spring 35 (shown as right hand wound) is elastically preloaded on an external circular surface 34 of the control drum 30 between a locating shoulder 30a on the drum 30 and a similar shoulder formed on a bearing metal washer 36. Further, the control spring 35 is free floating on the control drum 30 (unattached at their end) and normally turns with it. Control spring 35 has an abutment 38 on one end formed as by a radial toe or lug portion of the spring stock disposed for engagement by actuator stop member A in a broken-line-illustrated position of that member to cause engagement of the clutch. With such right hand would control spring 35 and the indicated direction of operation of the clutch the control spring applies sufficient braking force to the control drum 30 while overrunning on that drum to contract the coils 24 of the driving spring 22 into gripping relationship to the main clutch drum surfaces 15 and 16 and, thereafter until the stop member A is withdrawn from the normal path of rotation of lug 38 the control spring continues to exert an approximately uniform braking torque on the control drum or something more than the necessary torque to maintain the main spring coils 24 in gripping engagement with drum surface 16. With the control spring 35 flat wound and disposed externally of the control drum the wear on the braking surfaces is distributed over a wide area and the friction heat during engagement periods is readily dissipated, especially since the external surface portions of the control spring are exposed to atmosphere. While the clutch is disengaged the only friction is in the bearings 20 and 21 and between the right hand end portion of the control drum 30 and the bearing ring 27 or between the ring 27 and the other stationary output member 17.

Impact shock incident to engagement of the clutch, particularly as shown in Fig. 2, is cushioned somewhat by reason of partial uncoiling of the control spring 35 near the lug or toe 38, by slippage of that spring on the control drum 30 as that drum turns with reference to the input member 10 in contracting the driving spring into driving position on output drum surface 16 and by some slight slippage of the driving spring 22 on surface 16 as the speed of shaft P' is accelerated to the speed of input member 10.

The construction and operation of the clutch 2 according to Fig. 3 are essentially the same as of the clutch 1 of Fig. 2 and the corresponding parts have been given the same numbers. In Fig. 3 the control drum 30a is a cylindrical metal sleeve, and a stop ring 40 (e.g. plastic to conserve inertia mass) is journalled for angular movement on the control drum 30a, and the ring 40 has an axially slotted arm 41 for engagement with the control spring toe 38. The control ring 40 in this case adds some inertia to the assembly but it enables actuation of the clutch in as many turned positions as desired as by provision of a plurality of abutment surfaces 42 about the periphery of the ring for engagement by the stop member A. The outward deflection of the toe-associated end coil of the control helical spring 35 can be limited if desired (as for low speed operation) by providing close proximity between a surface such as 43 on the arm 41 closely overhanging the spring adjacent the toe. The clutch control spring 35 and stop ring 40 are maintained loosely in position by axially opposite surfaces on a rib 30b of the control drum and on an assembly-retaining snap ring 44 respectively.

In the construction according to Figs. 4 and 4a, the various parts which correspond functionally and otherwise to those of Figs. 2 and 3 are usually given the same numbers but primed ('). In this arrangement which is considerably simpler than those previously described the control drum member 50 is a cylindrical metal sleeve having one or more abutments 42' thereon for engagement with the actuator member (not shown). The sleeve 50 is journalled for free movement relative to the input member 10' at cylindrical surfaces 51 and 52 on the input member and shaft adapter 17' respectively. The control helical coil member 55 in this case is preferably an integral part of the driving spring 22' although it could just as well be a separate coil member (e.g. flat wound as in the case of coil member 35 Fig. 3) attached to the free end of the spring 22'. Coil member 55 has the same direction of winding as driving spring 22' and is elastically preloaded against the internal cylindrical control drum member surface 34'. The dimensional difference or interference between the radially outward surface of control coil member 55 as formed and control drum surface 34' has to be sufficient so that the overrunning drag moment of coil member 55 on drum surface 34' is greater than the spring moment required to contract the coils 24' against the clutch output drum surface 16' or to eliminate the normal radial clearance space S' and additionally to provide the necessary energizing torque. Any greater amount of preloading of the control coil member 55 on the control drum surface 34' will simply increase the overrunning drag during engagement periods of the clutch; and, except in installations such that engagement time is always a small part of the total operating time that would be undesirable. Incidentally, heat dissipating fins (not shown) can be formed or supported on the sleeve 50 around the region of overrunning engagement of the control coil member 55 for use when engagement periods are protracted.

Figs. 4 and 4a show a stepped input drum construction and appropriate spring form for use therewith. The step (at 56) enables preloading of a cylindrically wound spring (coils 58, Fig. 4a) on the larger diameter portion of drum surface 15' while allowing the remaining coils of group 58 to have clearance at the crossover region and around the entire surface 16'. Such stepped drum construction, especially if free end coils of the spring are cantilever-supported as usual in normally disengaged spring clutches, is inadequate to prevent spasmodic or intermittent undesirable contact between the normally spaced coils and the associated drum, and the step (as at 56) is a region of high wear. In the construction according to Fig. 4 the preloading of the control coils 55 in the control sleeve 50 helps greatly in maintaining the full circumferential clearance S' (since both ends of the clutch spring are centeringly supported), but the preferred arrangement, for full centering support, is described below in connection with Figs. 5 and 5a.

The construction according to Fig. 4 as against those of Figs. 2 and 3, if designed to serve equal torque requirements, would be somewhat longer axially of the output shaft, and the helical coil control surfaces would not be as suitable for continued overrun in event the clutch has to be engaged for protracted period. On the other hand, in Fig. 4, all essential portions of the main and control coils and of the control drum surface 34'' are shielded by the sleeve 50 against entrance of dirt or other abrasive or contaminating matter.

The clutch according to Figs. 5 and 5a is generally the same as that of Fig. 4, Fig. 5 showing the portions of the input and output drum members 10' and 17' which are omitted from Fig. 4. The control drum 50" for reduction of mass and to minimize engagement impact, is mainly of tough plastic material but having a hard metal insert ring 60 suitably secured against rotating relative to the plastic body of sleeve 50" and providing control drum surface 34" in interference fitting overruning contact with end coils of driving spring 22" constituting control coil member 55".

In Fig. 5, the step 56 (of Fig. 4) is avoided by making the drum surfaces 15" and 16" of equal diameters and winding or forming the various coils of the spring 22" as shown by Fig. 5a which illustrates three different relatively stepped groups of coils in the relaxed state of the spring. Group 62 coils, Fig. 5a, have inner diameters smaller than input drum surface 15"; group 63 coils are of sufficiently larger diameter to establish the normal clearance S", and group 64 coils are still larger for coaction with control drum surface 34" as already described. As a positive means to maintain uniformity of the annular clearance space S" the step or enlargement of coils 64 in relation to the outer diameters of coils 63 equals the amount of deflection of coils 63 necessary for preloading in control drum ring 60. Thus the coils 63 normally make light contact with the inner surface of the sleeve 50". The same full spring centering feature can be obtained in the construction according to Fig. 4, augmenting the centering effect of control coil member 55 for the coils 24' which would otherwise have only cantilever support by input member 10'.

The various constructions described above operate effectually as torque limiters. The maximum torque that can be transmitted by the main or driving springs 22, 22' and 22" depends upon the energizing force or torque which is imparted to the coils 24 in the case of Fig. 2 or to the coils 24' in Fig. 4 or to the coils 63 of Figs. 5 and 5a. Thus, as in Figs. 5 and 5a, for example, if the amount of interference fit between coils 64 (Fig. 5a) and the control drum surface 34" (Fig. 5) is held to close limits, the normal clearance S" is similarly held and the number of coils for contact with drum surface 16" is properly chosen, then neglecting subsequent wear, the main driving coils (63 in that case) will always slip on the drum surface 16" at a predetermined value within desirable limits.

The problem of computing slip point or designing the clutch to have a maximum torque transmitting capability is reduced as compared to prior practice by the fact that the perplexing variable namely, coefficient of friction, can be neglected so far as designing the control coil and control drum elements is concerned since the control coil and control drum surfaces operate in the overrunning as against the usual clutching direction in spring clutch practice.

We claim:

1. In a normally disengaged type spring clutch, a normally turning input member, a normally stationary output clutch drum coaxial therewith, a helical clutch spring secured to turn with the input member and having coils normally free from the output drum but arranged to grip it, a control drum member supported normally to turn with the input member about its axis but being capable of angular movement relative thereto, a full floating control coil spring member preloaded on the control drum member so as to overrun thereon continuously when the clutch is engaged, one of said control members being connected to the normally free coils of the clutch spring so as to deflect those coils into gripping contact with the output drum as a function of overrunning of the control coil member against the control drum member whenever a predetermined rotation-restraining force is applied to the other control member, and actuator means operable to apply such force.

2. The clutch according to claim 1, wherein the control coil spring member is integral with the normally free coils of the clutch spring, and the control drum member is subjected to the rotation-restraining force.

3. The clutch according to claim 2 wherein the control drum member is supported at its opposite ends on circular surfaces of the input member and output drum and surrounds and provides a protective casing or dirt excluder for the clutch spring, the control drum surface and the control coil member.

4. The clutch according to claim 2, wherein the clutch spring is of the contracting-to-grip type, the control drum member is a sleeve surrounding the clutch spring, the control coil member in a relaxed state is of larger diameter than the normally free coils when relaxed, and the latter coils, during disengagement of the clutch, are supported at least in part concentrically of the output clutch drum out of contact therewith by peripheral contact between the control coil member and an inner surface of the sleeve.

5. In a normally disengaged type spring clutch, a normally turning input drum member, a normally stationary output clutch drum coaxial therewith, a helical clutch spring preloaded on the input drum member and having coils normally free from the output drum but arranged to grip it, a control drum member mounted normally to turn with the input drum member about its axis but being capable of angular movement relative thereto, a control coil spring member preloaded for continuous overrunning contact with the control drum member during engagement of the clutch, one of said control members being connected to the normally free coils of the clutch spring so as to deflect those coils into gripping contact with the output drum whenever a predetermined rotation-restraining force is applied to the other control member, the control drum member having a circular surface adjacent to and normally in light contact with the normally free coils of the clutch spring, whereby positively to maintain those coils out of contact with the output drum during disengagement of the clutch.

6. In a normally disengaged type spring clutch, a normally turning input clutch drum, a normally stationary output clutch drum coaxial therewith and adjacent thereto, a helical clutch spring preloaded at one end on the input drum and having coils intermediately of its ends normally free from the input and output drums but arranged to grip the drums, a control drum member mounted normally to turn with the input drum about its axis but being capable of angular movement relative thereto, said spring having an integral control coil portion at its opposite end in preloaded relationship to a surface of the control drum member in a direction radially opposite from the direction of movement of the normally free coils into gripping relationship to the drums, and actuating means capable of preventing rotation of the control drum with the input clutch drum to cause engagement of the clutch.

7. In a normally disengaged type spring clutch adapted to transmit torque in one direction, relatively angularly movable, axially adjacent input and output clutch drums of approximately equal diameter at their region of adjacency, a driving helical clutch spring bridging the drums and having coils at one end preloaded on the input drum and intermediately of its ends normally free from the input and output drums but peripherally close thereto, a control drum member freely journalled for angular movement relative to the input drum about the common axis of the drums, and a control helical coil member on the opposite end of clutch spring in free floating elastically preloaded relationship to the control drum member in a direction to overrun thereon and cause relative angular movement of the control drum member and input clutch drum and deflection of said normally free coils into gripping engagement with the clutch drums whenever the control drum member is subjected to predetermined rotation-restraining torque.

8. In a helical coil or helical spring clutch, a normally turning input member, a normally stationary output clutch drum coaxial therewith, a helical clutch spring secured to turn with the input member and having coils normally free from the output drum but arranged to grip it, a control drum member supported normally to turn with the input member about its axis but being capable of angular movement relative thereto, a full floating control coil spring member preloaded on the control drum member so as to overrun thereon continuously when the clutch is engaged, said control drum member being connected to the normally free coils of the clutch spring so as to deflect those coils into gripping contact with the output drum as a function of overrunning of the control coil member against the control drum member whenever a predetermined rotation-restraining force is applied to the control coil member, and actuator means operable to apply such force.

9. The clutch according to claim 8 wherein the control drum member is a sleeve surrounding the clutch spring and wherein the control coil spring member is preloaded for overrunning friction contact with an external drum surface of the control drum member to initiate engagement of the clutch.

10. The clutch according to claim 9 wherein the control coil spring member has a circumferential abutment or lug integral therewith for engagement with the actuator means.

11. The clutch according to claim 9, including a ring turnably mounted on the sleeve and connected to turn with the control coil member, and wherein the actuator means makes rotation-restraining contact with the ring to engage the clutch.

12. The clutch according to claim 11 wherein the ring has a rigid surface portion overhanging the control coil spring member close thereto in the region of connection between the ring and control coil member, operating to limit expansion of the control coil member away from the control drum surface of the sleeve.

References Cited in the file of this patent

UNITED STATES PATENTS

| | | |
|---|---|---|
| 2,551,739 | Harlan | May 8, 1951 |

FOREIGN PATENTS

| | | |
|---|---|---|
| 507,389 | Canada | Nov. 16, 1954 |
| 540,660 | Canada | May 7, 1957 |
| 781,820 | Great Britain | Aug. 28, 1957 |